United States Patent [19]
Vidmar et al.

[11] Patent Number: 5,901,526
[45] Date of Patent: * May 11, 1999

[54] LANDSCAPE TIMBER CONNECTING SYSTEM

[75] Inventors: James Vidmar, Willoughby; Peter Rimback, Viillage of Oakwood, both of Ohio

[73] Assignee: Hanover Catalog Holdings, Inc., Weehawken, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,355

[22] Filed: Apr. 30, 1996

[51] Int. Cl.$^6$ .................................. E04B 2/76; A01G 1/08
[52] U.S. Cl. ............................ 52/745.09; 47/33; 52/102; 52/745.11; 52/745.14; 52/71; 256/19
[58] Field of Search ................................ 52/71, 102, 155, 52/745.09, 745.1, 745.11, 745.14; 47/33; 256/1, 19, 24, 26; 16/221, 223, 254, 387

[56] References Cited

U.S. PATENT DOCUMENTS

| | | | |
|---|---|---|---|
| 2,244,042 | 6/1941 | Barlow | 16/387 |
| 3,537,687 | 11/1970 | Adelman . | |
| 3,545,128 | 12/1970 | La Fontaine et al. . | |
| 3,916,563 | 11/1975 | Tedesh . | |
| 4,099,347 | 7/1978 | Sharp | 16/223 |
| 4,353,146 | 10/1982 | Brockhaus | 16/387 |
| 4,498,660 | 2/1985 | Brema et al. | 256/19 |
| 4,869,018 | 9/1989 | Scales et al. | 47/33 |
| 4,971,475 | 11/1990 | Castonguay et al. . | |
| 5,080,523 | 1/1992 | Steiner | 47/33 X |
| 5,119,587 | 6/1992 | Waltz | 47/33 |
| 5,167,049 | 12/1992 | Gibbs | 16/253 |
| 5,168,678 | 12/1992 | Scott, Jr. et al. . | |
| 5,230,187 | 7/1993 | Reimann . | |
| 5,291,703 | 3/1994 | Johnson . | |
| 5,361,455 | 11/1994 | Kiefer | 16/387 X |
| 5,542,787 | 8/1996 | Charlenow | 52/71 |

*Primary Examiner*—Carl D. Friedman
*Assistant Examiner*—Timothy B. Kang
*Attorney, Agent, or Firm*—Thompson Hine & Flory LLP

[57] ABSTRACT

A landscape timber connecting system for use with landscape timber or the like, and includes a first member and a second member. The first member having a bracket that is shaped to engage an end of a first landscape timber, and a first hinge component. The second member having a bracket that is shaped to receive an end of a second landscape timber, and a second hinge component. The second hinge component is adapted to align with the first hinge component along a common, substantially vertical pivot axis. A hinge pin is shaped to engage the first and second hinge components along the common pivot axis and extend downwardly into ground beneath the system such that the first and second members can be pivotally positioned relative to each other about the common pivot axis to position associated engaged landscape timbers at a selected angle relative to each other, and the hinge pin anchors and fixes the system to the ground.

5 Claims, 5 Drawing Sheets

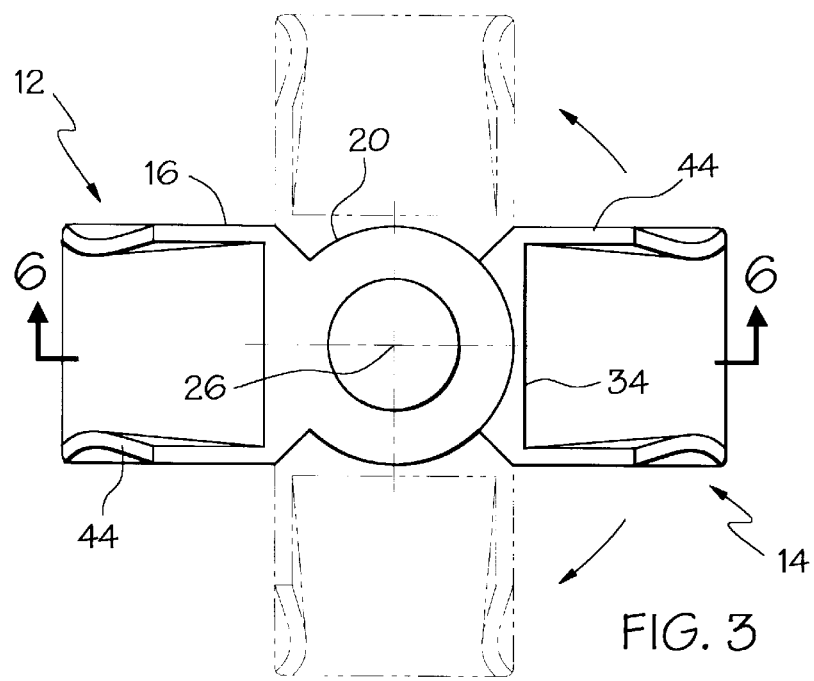
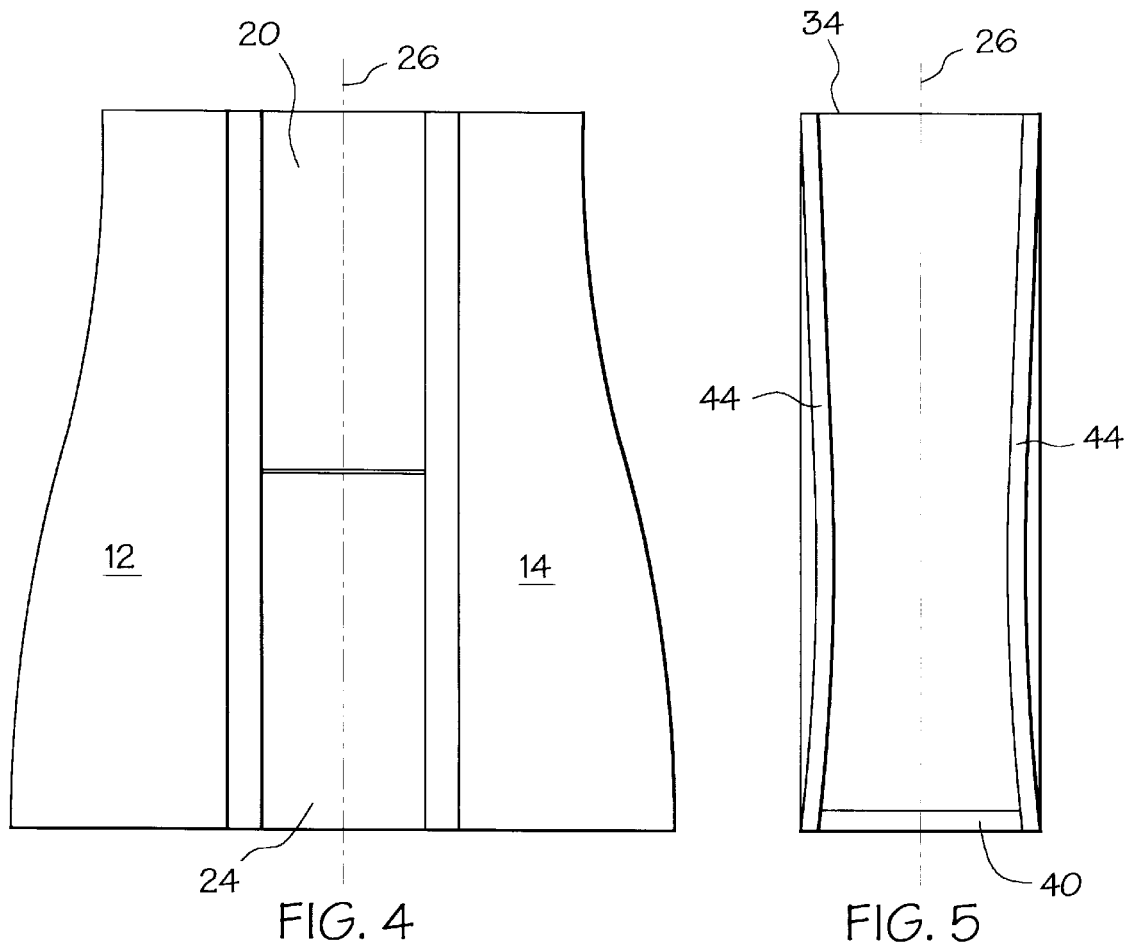

LANDSCAPE TIMBER CONNECTING SYSTEM

BACKGROUND OF THE INVENTION

The present invention relates to landscape retaining wall systems, and more particularly, to retaining wall systems employing interconnected landscape timbers and the like.

A popular structure for use in residential or light commercial landscaped areas is a retaining wall or border made of pressure treated lumber and the like. However, connecting two adjacent timbers has been problematic, especially for angular configurations such as borders that encircle a planting.

One attempt at solving this problem is disclosed in U.S. Pat. No. 5,291,708, which shows a modular framing system for use with landscape timber. The framing system includes a central spike having a plurality of slots, and at least two brackets that pivotally engage selected ones of the slots. The brackets are shaped to attach to landscape timber, such as 2×6 lumber. A disadvantage with that system is that it requires a specific angular formation to be preselected before assembling the components of the framing system. Accordingly, much time and effort is required to assemble that system.

Accordingly, there is a need for a landscape timber connecting system which is of simple construction, is adjustable and is easy to assemble.

SUMMARY OF THE INVENTION

The present invention is a landscape timber connecting system which employs two distinct members shaped to receive and support adjacent landscape timbers, in an upright configuration, and which include interconnecting components forming a hinge which pivots along a common central axis. The members each are freely rotatable about the common axis such that a desired angle for the landscape timber can be easily selected, and subsequently adjusted once the system is anchored to the ground.

In accordance with the present invention, the invention is a landscape timber connecting system for use with landscape timber or the like, and includes a first member and a second member. The first member having a bracket that is shaped to engage an end of a first landscape timber, and a first hinge component. The second member having a bracket that is shaped to receive an end of a second landscape timber, and a second hinge component. The second hinge component is adapted to align with the first hinge component along a common, substantially vertical pivot axis. A hinge pin is shaped to engage the first and second hinge components along the common pivot axis and extend downwardly into ground beneath the system such that the first and second members can be pivotally positioned relative to each other about the common pivot axis to position associated engaged landscape timbers at a selected angle relative to each other, and the hinge pin anchors and fixes the system to the ground.

In another embodiment of the present invention, the invention is a landscape timber connecting system for use with landscape timber or the like, and includes a first landscape timber member, a first member, a second landscape timber member, and a second member. The first member having a bracket connected to an end of the first landscape timber, and a first hinge component. The second member having a bracket connected to an end of the second landscape timber, and a second hinge component. The second hinge component being adapted to align with the first hinge component along a common, substantially vertical pivot axis. A hinge pin is shaped to engage the first and second hinge components along the common pivot axis and extend downwardly into ground beneath the system such that the first and second members can be pivotally positioned relative to each other about the common pivot axis to position the first and second landscape timbers at a selected angle relative to each other, and the hinge pin anchors and fixes the system to the ground.

Accordingly, it is an object of the present invention to provide a landscape timber connecting system for use with landscape timber or the like; a landscape timber connecting system that permits various shapes of perimeters to be formed along and around areas, such as flower beds and the like; a landscape timber connecting system that permits free rotation of landscape timber around a common axis; is relatively inexpensive; permits quick and easy changes in the angles formed by the landscape timber connecting system; and takes a minimal amount of effort and time.

BRIEF DESCRIPTION OF THE DRAWINGS

FIG. 3 is a top plan view of the landscape timber connecting of FIG. 1;

FIG. 4 is a front plan view of the landscape timber connecting system of FIG. 3, without the hinge pin;

FIG. 5 is a side plan view of the landscape timber connecting system of FIG. 3, without the hinge pin;

DETAILED DESCRIPTION

Figure 1:
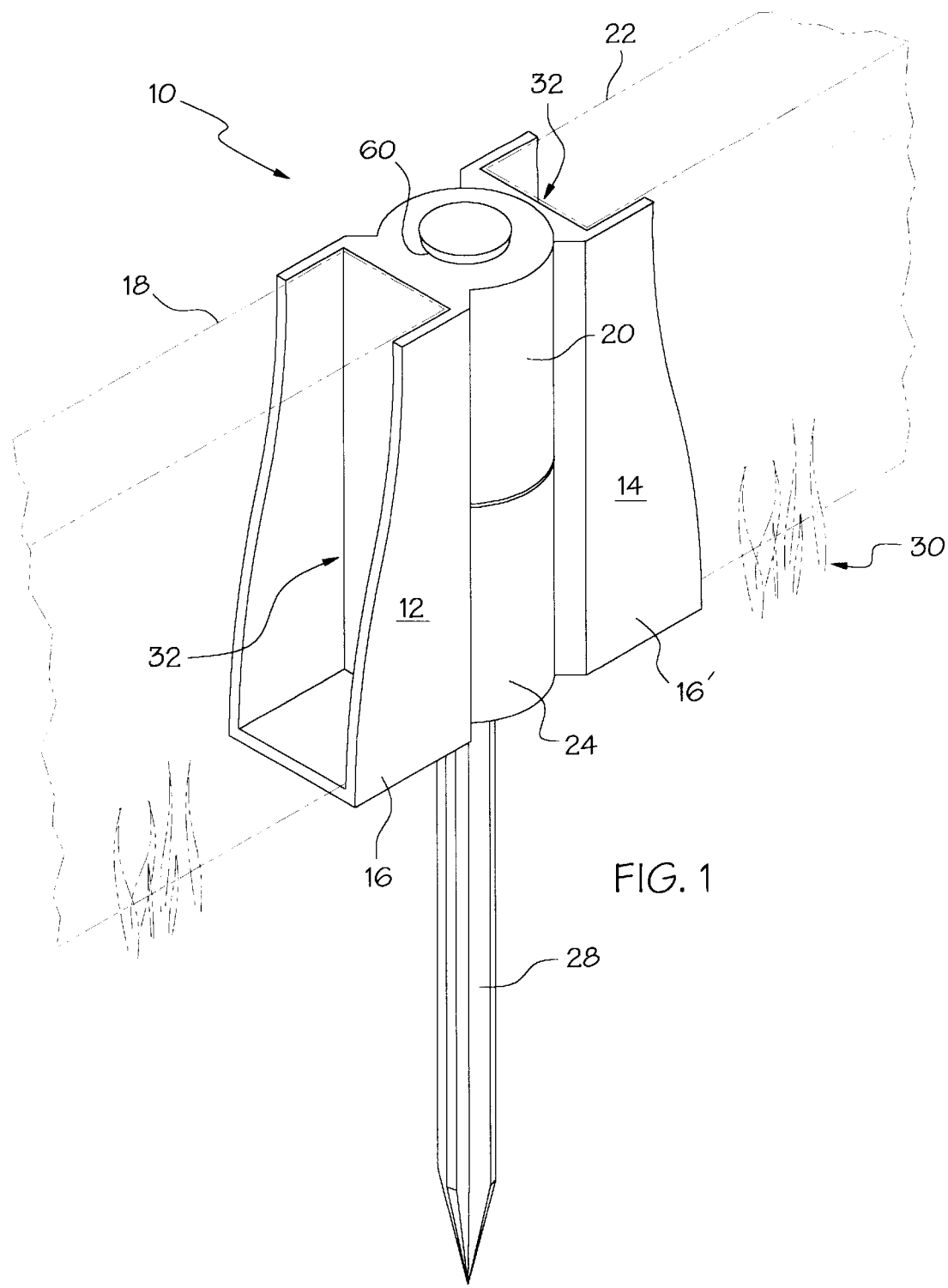
FIG. 1 is a perspective view of a preferred embodiment of a landscape timber connecting system of the present invention.
Figure 2:
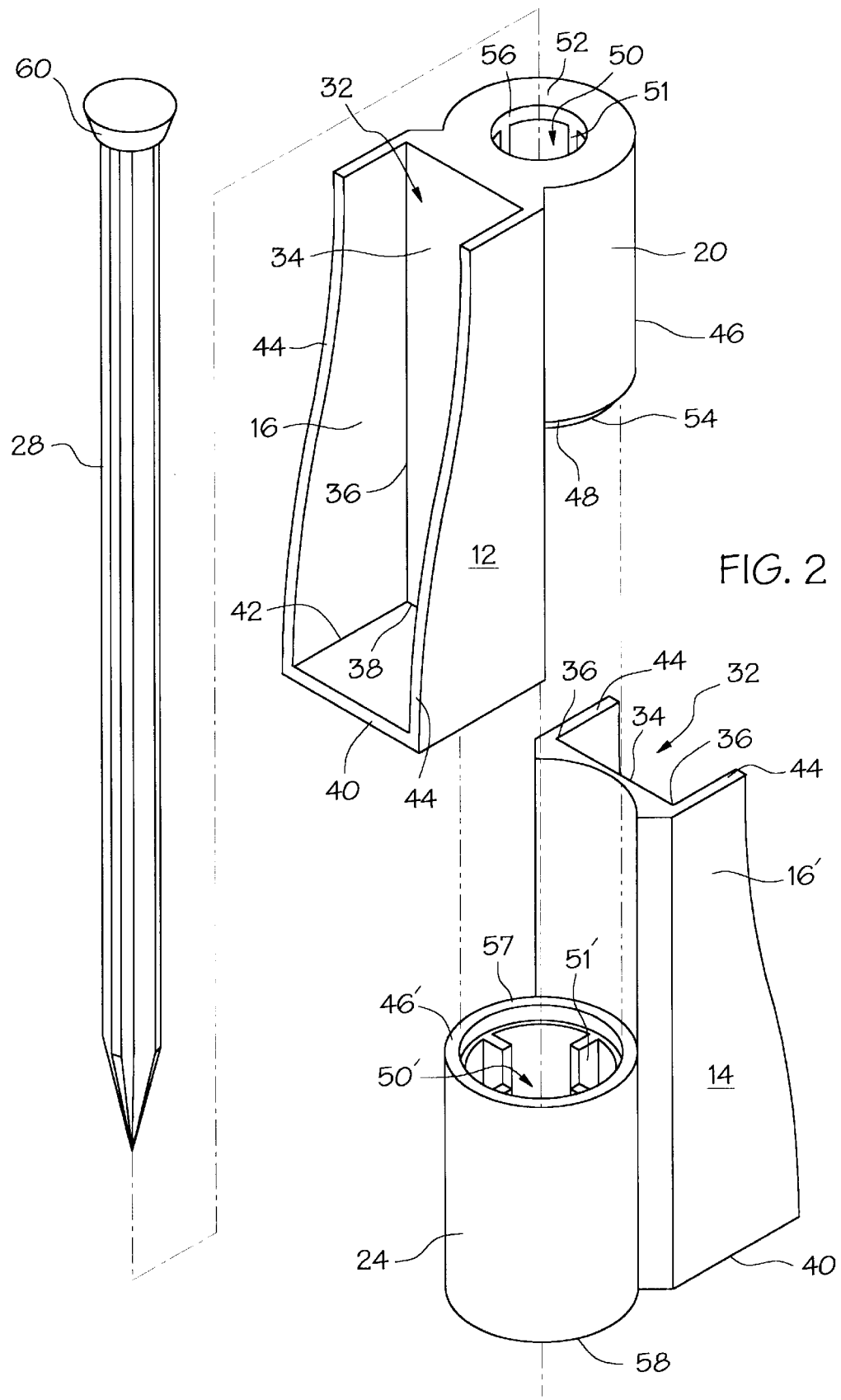
FIG. 2 is an exploded, perspective view of the landscape timber connecting system of FIG. 1.
Figure 6:
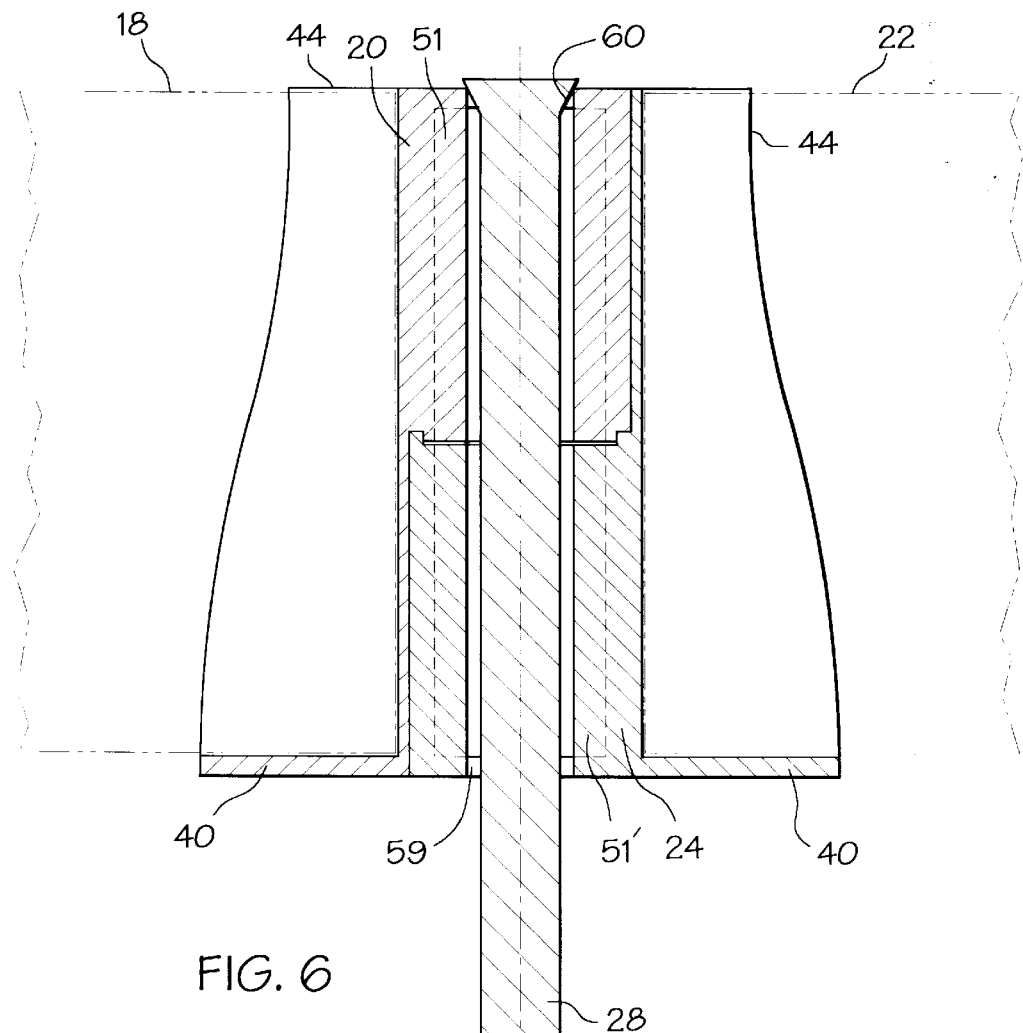
FIG. 6 is a cross-sectional view of the landscape timber connecting system taken at line 6—6 of FIG. 3.

As shown in FIGS. 1, 2 and 6, a landscape timber connecting system, generally designated 10, of the present invention includes a first member 12 and a second member 14. The first member 12 includes a bracket 16 that is shaped to engage an end of a first landscape timber 18, and a first hinge component 20. The second member 14 includes a bracket 16' that is shaped to engage an end of a second landscape timber 22, and a second hinge component 24. The second hinge component 24 is adapted to align with the first hinge component 20 along a common, substantially vertical pivot axis, generally designated 26. A hinge pin 28 is shaped to engage the first and second hinge components 20 and 24, respectively, along the common pivot axis 26 (as illustrated in FIGS. 3 and 5) and extend downwardly into ground, generally designated 30, beneath the system 10 such that the first and second members, 12 and 14, respectively, can be pivotally positioned relative to each other about the common pivot axis 26 to position associated engaged landscape timbers 18, 22, at a selected angle relative to each other. The hinge pin 28 anchors and fixes the system 10 to the ground 30.

The first and second members, 12 and 14, respectively, have a bracket 16, 16'. These brackets 16, 16' are preferably of identical structure, namely, the brackets 16, 16' include a sleeve, generally designated 32, shaped to receive the end of the first landscape timber 18 and the second landscape timber 22, respectively. The sleeve 32 includes a rear wall 34 having side edges, generally designated 36, and a bottom edge 38, a bottom wall 40 extending horizontally outward from the bottom edge 38 of the rear wall 34 and having side edges, generally designated 42, and a pair of side walls 44. Each side wall 44 extends between associated ones of the side edges, 36 and 42, of the rear and bottom walls, 34 and 40, respectively. The end of the landscape timber 18 or 22 may rest upon the bottom wall 40 and be restricted in movement by the rear and side walls, 34 and 44, respectively. Preferably, the side walls 44 are partially converging away from side edges 42 of the rear wall 34, as illustrated in FIG. 3, to provide enhanced restricted movement of the landscape timber 18, 22, in all directions. Those skilled in the art will appreciate that other means for securing the landscape timber to the first and second members is not outside the scope of the present invention.

The first and second hinge components, 20 and 24, respectively, include a cylindrical housing, 46 and 46', respectively. The first cylindrical housing 46 includes a pilot portion 48 that is shaped to be inserted into the second cylindrical housing 46'. The first and second hinge components, 20 and 24, respectively, further include a substantially vertical channel, generally designated 50 and 50', respectively. Preferably, the first and second hinge components, 20 and 24, include ribs, generally designated 51 and 51', respectively, which act as a guide for the hinge pin 28 as it passes through the first hinge component channel 50 and the second hinge component channel 50'. Preferably, the first hinge component channel 50 includes top and bottom ends, 52 and 54, respectively. The top end 52 is partially closed such that an orifice 56, which leads to the channel 50, is formed. Preferably, the orifice 56 is substantially circular in configuration. Preferably, the second hinge component channel 50' includes top and bottom ends 57 and 58, respectively. The bottom end 58 is partially closed such that and orifice 59 (as illustrated in FIG. 6), which leads from the channel 50' to the ground 30, is formed.

The hinge pin 28 includes a flared head 60 that is larger than the orifice 56 of the top end 52 of the first hinge component channel 50. Preferably, the orifice 56 is configured to permit all but the flared head 60 to pass through to the channel 50. As a result, the flared head 60 of the hinge pin 28 is prevented from passing through the orifice 56 and entering the channel 50.

As shown in FIG. 3, the first and second members, 12 and 14, respectively, are freely rotatable about the common, pivot axis 26 such that any angle in the range of about 90° to about 180° can be selected and formed between the first and second members 12 and 14. Changing the angle is easy accomplished, due to the fact that the hinge components, 20 and 24, of the first and second members 12 and 14, respectively, are align along a common, substantially vertical pivot axis 26.

Figure 7:
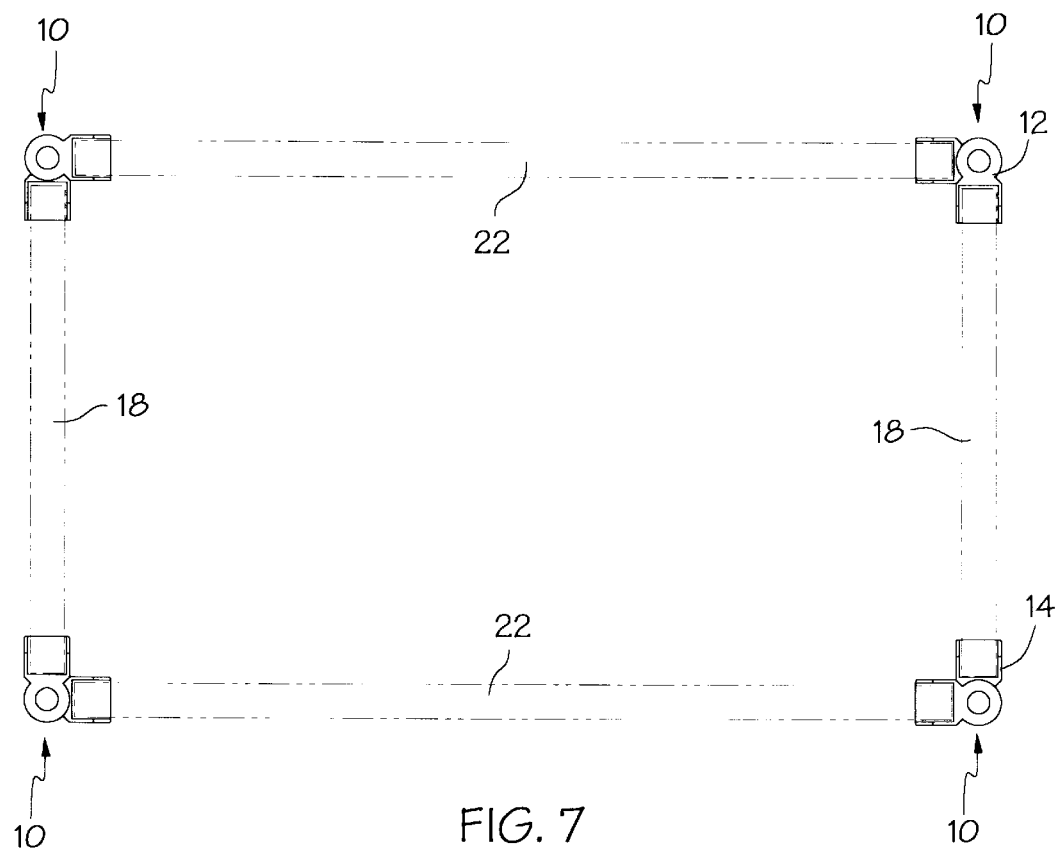
FIG. 7 is a schematic view of the landscape timber connecting system of FIG. 1 used to form a perimeter.
Figure 8:
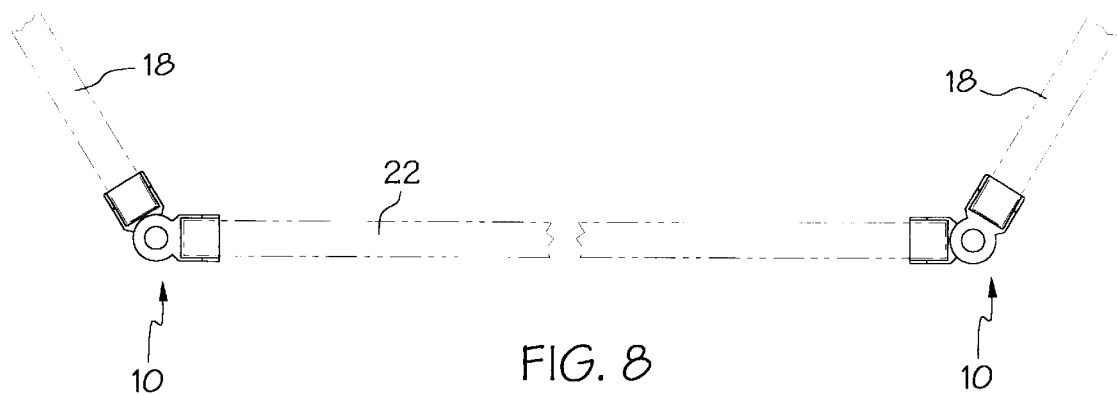
FIG. 8 is a schematic view of the landscape timber connecting system of FIG. 1 used to create an alternative perimeter.

As shown in FIGS. 7 and 8, the landscape timber connecting system 10 can be used to create perimeters of any shape, including, but not limited to, a rectangular perimeter, as illustrated in FIG. 7, and an irregularly shaped perimeter, as illustrated in FIG. 8. Landscape timber 18 and 22 can be supported between two landscape timber connecting systems 10. One end of the landscape timber, 18 or 22, is connected to the first member 12 of one landscape timber connecting system 10 and the other end of the landscape timber, 18 or 22, is connected to the second member 14 of another landscape timber connecting system 10.

In some cases, the landscape timber connecting system 10 can be adapted to be stackable upon other such landscape timber connecting systems 10.

Preferably, the first and second members, 12 and 14, and the hinge pin 28 are made from a suitable plastic material, more preferably, the material is high density polyethylene and are made by an injection molding process.

Those skilled in the art will appreciate that other materials may be used to make the first and second members, 12 and 14, and the hinge pin 28, such materials are not outside the scope of the present invention.

Preferably, the landscape timber connecting system of the present invention is used with standard 2"×6" construction lumber.

Having described the invention in detail and by reference to the drawings, it will be apparent that modification and variations are possible without departing from the scope of the invention as defined in the following claims.

What is claimed is:

1. A method for connecting landscape timbers to create a landscape border comprising the steps of:

selecting a first member having a landscape timber engaging bracket and a hinge component, wherein said timber engaging bracket includes a pair of converging sidewalls and a basewall and said hinge component includes a channel for receiving a hinge pin and a pilot portion;

selecting a second member having a landscape timber engaging bracket and a hinge component, wherein said timber engaging bracket includes a pair of converging sidewalls and a basewall and said hinge component includes a channel for receiving a hinge pin and a recess for receiving a pilot portion;

placing an end of a first landscape timber in said first member timber engaging bracket;

placing an end of a second landscape timber in said second member timber engaging bracket;

aligning said first member hinge component channel with said second member hinge component channel by mating said first member pilot portion with said second member recess thereby forming a common, substantially vertical pivot axis between said first and second members; and inserting a hinge pin through said pivot axis formed by said channels into ground located underneath said members, thereby pivotally anchoring said members to said ground.

2. The method of claim 1 wherein said hinge pin inserting step includes a step of selecting a hinge pin with a flared head that is larger than said channels.

3. The method of claim 1 wherein said hinge pin inserting step includes a step of selecting a hinge pin shaped to be easily inserted into said ground.

4. The method of claim 1 wherein said first and second member selecting steps each include a step of selecting first and second members having timber engaging brackets with concave side walls.

5. A method for connecting landscape timbers to create a landscape border comprising the steps of:

selecting a first member having a landscape timber engaging bracket and a hinge component, wherein said timber engaging bracket includes a pair of converging, concavely shaped sidewalls and a basewall and said hinge component includes a channel formed therethrough for receiving a hinge pin and a pilot portion formed thereon;

selecting a second member having a landscape timber engaging bracket and a hinge component, wherein said timber engaging bracket includes a pair of converging, concavely shaped sidewalls and a basewall and said hinge component includes a channel for receiving a hinge pin therethrough and a recess for receiving a pilot portion therein;

placing an end of a first landscape timber in said first member timber engaging bracket;

placing an end of a second landscape timber in said second member timber engaging bracket;

aligning said first member hinge component channel with said second member hinge component channel by mating said first member pilot portion with said second member recess thereby forming a common, substantially vertical pivot axis between said first and second members; and inserting a hinge pin through said pivot axis formed by said channels into ground located underneath said members, thereby pivotally anchoring said members to said ground such that an angle between said first and second timbers may be freely adjusted through a range of 180°.

* * * * *